United States Patent [19]
Goto et al.

[11] Patent Number: 5,775,409
[45] Date of Patent: Jul. 7, 1998

[54] COOLING TOWER

[75] Inventors: Osamu Goto, Ushiku; Koji Kimura, Chiba, both of Japan

[73] Assignee: Ishikawajima-Harima Heavy Industries Co., Ltd., Tokyo, Japan

[21] Appl. No.: 739,299

[22] Filed: Oct. 29, 1996

[30] Foreign Application Priority Data

Oct. 30, 1995 [JP] Japan .................................. 7-282017

[51] Int. Cl.$^6$ .............................. F28F 27/02; B01F 3/04
[52] U.S. Cl. ......................... 165/101; 165/900; 165/100; 261/153; 261/112.2; 261/DIG. 77
[58] Field of Search ..................... 165/100, 101, 165/900, 115, 111; 261/112.1, 153, DIG. 11, DIG. 77, 112.2

[56] References Cited

U.S. PATENT DOCUMENTS

| | | | |
|---|---|---|---|
| 3,997,635 | 12/1976 | Hallgren | 261/161 |
| 4,252,752 | 2/1981 | Flandroy | 261/153 |
| 4,337,216 | 6/1982 | Korsell | 261/112 |
| 4,427,607 | 1/1984 | Korsell | 261/112 |
| 4,964,977 | 10/1990 | Komiya et al. | 261/130 |
| 5,505,883 | 4/1996 | Kato | 261/153 |

*Primary Examiner*—Allen J. Flanigan
*Attorney, Agent, or Firm*—Fish & Richardson P.C.

[57] ABSTRACT

The present invention relates to a cross flow type cooling tower with which it is possible to prevent emission of white vapor in cold weather. In order to accomplish the above object, the cooling tower of the present invention is constructed of heat exchange units each of which having plates arranged vertically and parallel from each other so as to form passages therebetween, which are separated into wet air passages and switchable air passages capable of switching from dry air passages and wet air passages; a water bath divided into upper and lower baths by a partition plate with holes, the upper bath is provided with spray nozzles for spraying water into the switchable passages, the lower bath provided with spray nozzles for spraying water into the wet passages.

When the weather is warm, hot water is supplied into the upper bath, and both the upper and lower baths are filled with water and cooling is performed in every passage. However, when the weather is cold, then the water is supplied to the lower bath, and only the wet passages are used for heat dissipation and the switchable passages are uses to produce dry air to prevent generation of white vapor by mixing the dry air with the moist air.

8 Claims, 4 Drawing Sheets

COOLING TOWER

BACKGROUND OF THE INVENTION

The present invention relates to a cooling tower for cooling hot water by vaporizing a portion of the hot water during direct contact of the hot water with open air.

A cooling tower for cooling hot water is provided generally, as illustrated in FIG. 4, with an exhaust port 3 having a fan 2 mounted at the center of a roof of a casing 1 of the cooling tower, air intake fins 4 provided at the outer periphery of the casing 1, a hot-water bath (a water bath) 5 mounted adjacent to the exhaust port 3 on the roof of the casing 1, and heat exchange units 7 for exchanging heat with the hot water by direct contact of the hot water with the open air, which, after being taken in from the air intake 4, is directed to contact the hot water sprayed by spray nozzles 6 attached at the bottom of the hot water tank 5. The heat exchange units 7 consist of a dry air-heater 8 disposed at the bottom of the water bath 5 and a plurality of filling plates 9 disposed beneath the air-heater 8. The filling plates 9 are vertically arranged parallel with each other so as to form a plurality of constant passages therebetween.

In the above cooling tower, hot water in the hot water bath 5 flows into the passages defined by filling plates 9 through the fin-tubes in the air-heater 8, and, at the same time, the open air 10 taken in from the air intake 4 is directed to flow in the horizontal direction in the air heater 8 and the filling plates 9. Cooling is efficiently performed by direct contact of taken-in air 10 with the hot water falling down surfaces of the filling plates 9 and by evaporation of a portion of the hot water. In this case, the outer air 10 after exchanging heat with hot water, is converted into moist-air 11 with a relative humidity of 100%. If the moist air is exhausted from the cooling tower, white vapor is generated when the atmospheric temperature is low. Generation of white vapor in the exhaust is not preferable. In order to prevent generation of white vapor in the exhaust, the above cooling tower is equipped with an air heater to produce dry air and dry air produced by the air-heater 8 is mixed with the moist air before exhausting the moist air from the cooling tower.

However, the requirement to install the exclusive air-heater in the cooling tower to prevent white vapor complicates the structure of the cooling tower and necessitates a larger cooling tower.

SUMMARY OF THE INVENTION

It is an object of the present invention to provide a cooling tower having a simple structure and a relatively small size with a capability of easy handling and of eliminating white vapor.

In order to accomplish the above object, the cooling tower of the present invention comprises a water bath in the upper portion of a casing, hot water in the water bath being sprayed into the filling plates in heat-exchange units through spray nozzles attached at the bottom of the water bath, and the heat-exchange being performed by the direct contact of the hot water falling down the vertical passages with open-air flow taken in from the outside through air intake fins, passages defined by filling plates are arranged for moist-air passages and switching passages capable to switch over moist air passage to dry air passages

DETAILED DESCRIPTION OF THE PREFERRED EMBODIMENT

Referring to FIGS. 1, 2, 3A, and 3B, a preferred embodiment of the present invention will be explained.

The cooling tower of the present invention is designed to be able to changeover the operating mode; one mode is for times when the temperature of the open air is low so that generation of white vapor is anticipated, and the other mode is for times when the temperature of open air is high and the danger of white vapor generation is not anticipated. When there is a danger of generating white vapor, a part of the capacity of the cooling tower is converted to eliminate the generation of white vapor. However, if no danger of white vapor is anticipated, the cooling tower is operated at its full capacity.

Figure 1:
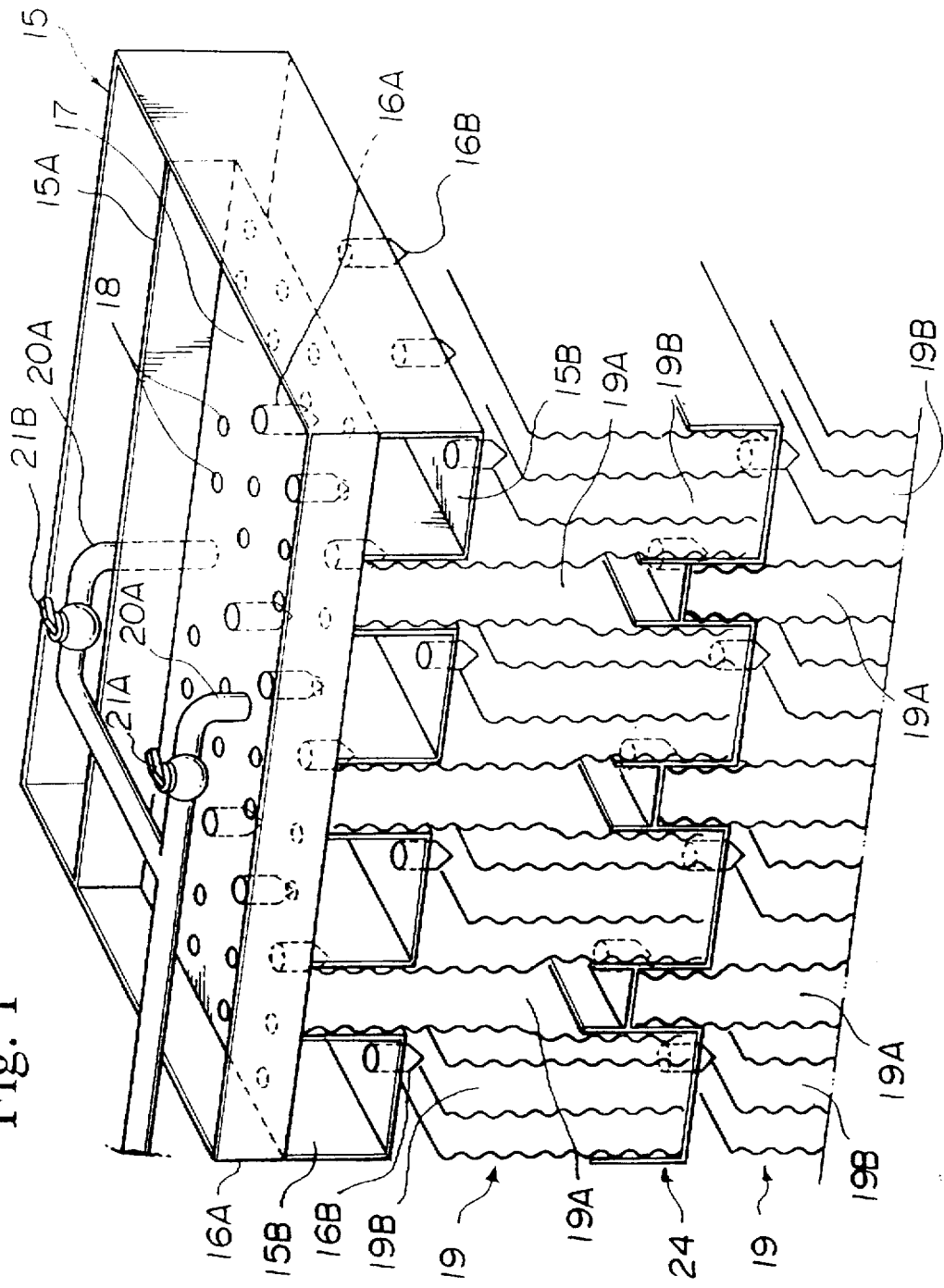
FIG. 1 is a perspective view showing the main portion of the cooling tower according to the preferred embodiment of the present invention.
Figure 2:
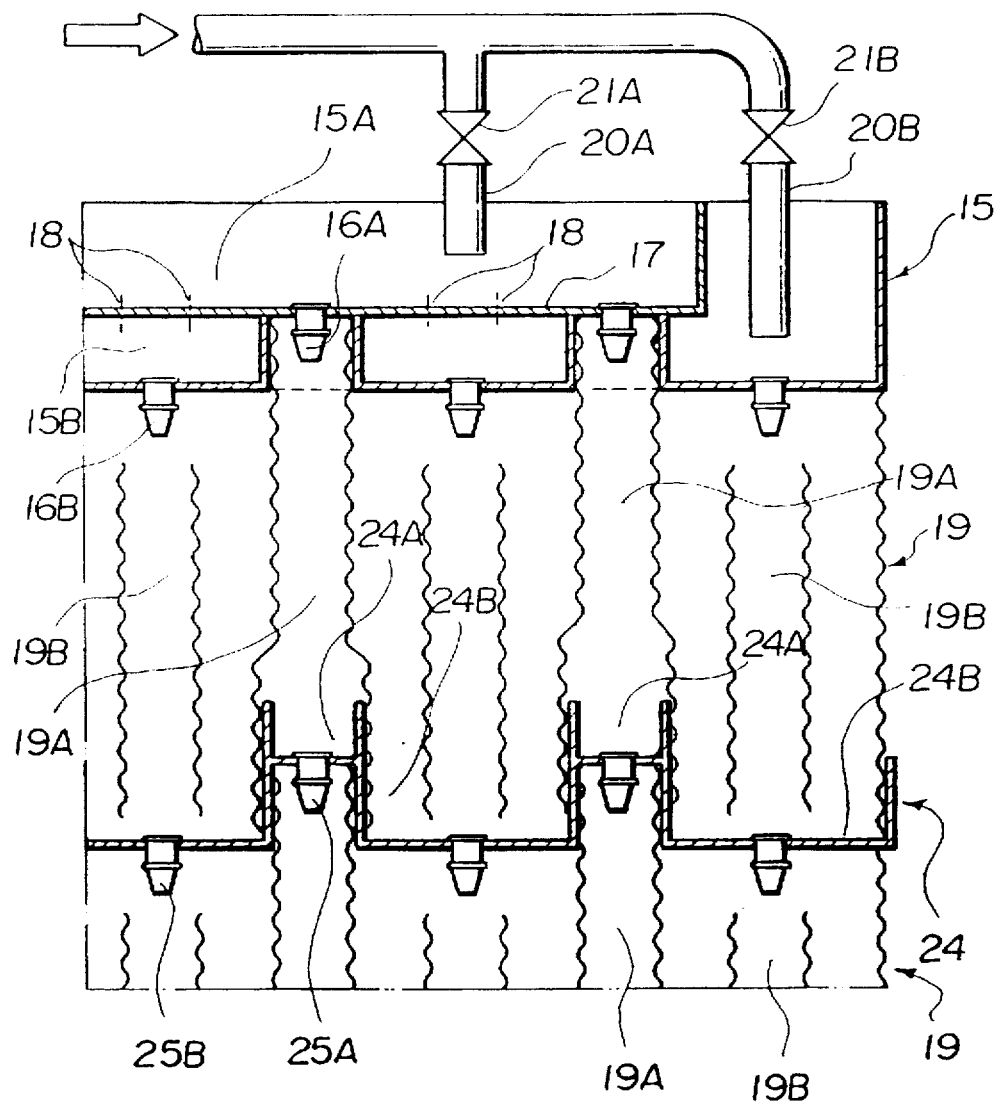
FIG. 2 is a cross sectional view of the main portion of the cooling tower shown in FIG. 1.
Figure 3A:
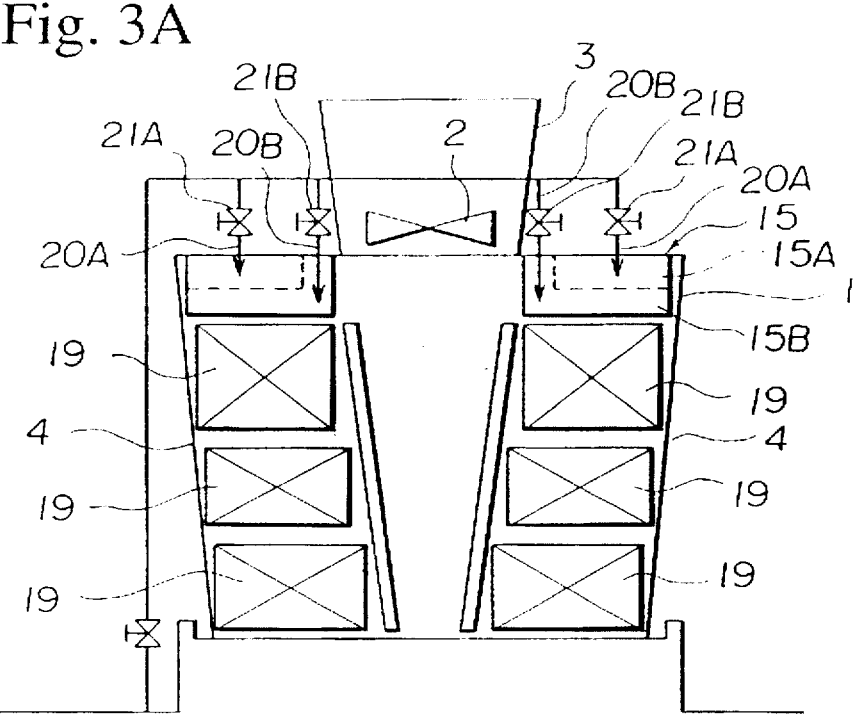
FIG. 3A and 3B depict schematic drawings of the whole structure of the cooling tower of the present intention.
Figure 3B:
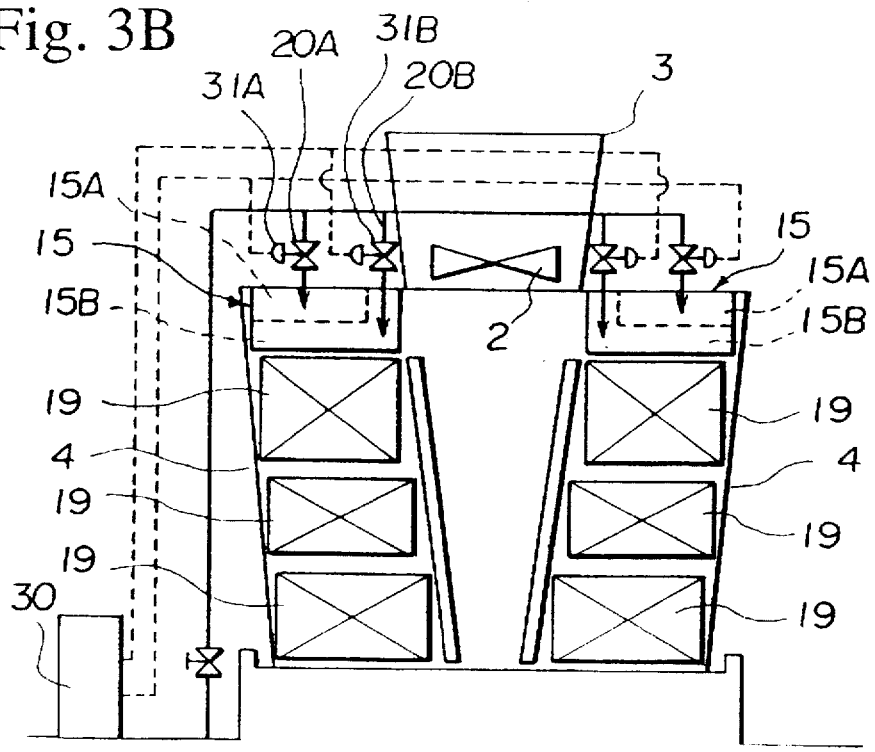
Figure 4:
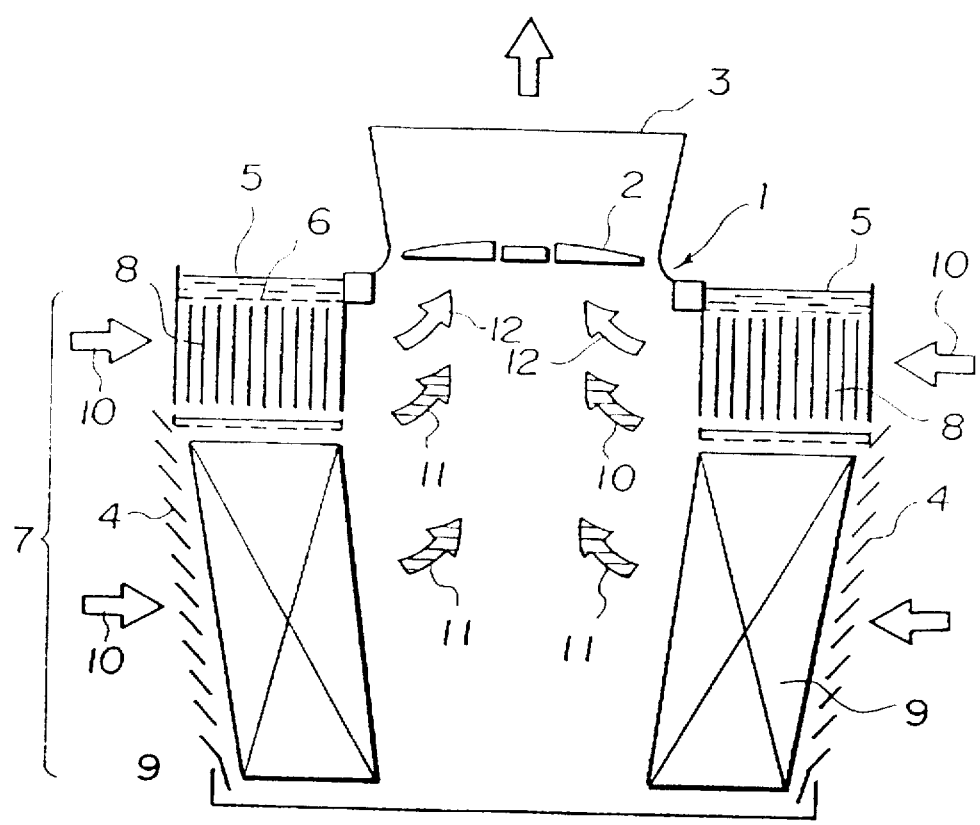
FIG. 4 is a cross-sectional view of the cooling tower of the prior art.

FIG. 3A and 3B depict schematically the structural formation of the cooling tower of the present invention. The cooling tower comprises, a fan 2 for absorbing open air disposed in a exhaust port 3 attached at the center of the roof of the casing 1, and an intake 4 provided around the outer periphery of a casing 1, and a water bath 5 disposed on the casing 1, surrounding the exhaust port 3. In the casing 1, there is provided a heat dissipation unit 19 composed of a plurality of filling plates 19 which are arranged vertically and parallel from each other and provide a plurality of passages in the vertical direction for hot water to flow down. FIGS. 1 and 2 show the structure of main portion of the cooling tower. The heat dissipation unit 19 has upper and lower stages, each of which is constituted of a plurality of filling plates to provide flow-down passages. These passages defined by filling plates 19 are distinguished into two type of passages; one type is switchable passages 19A capable of switching from wet passages to dry passages, and the other type is wet passages 19B to always operate in a wet condition. Both switchable and wet passages 19A and 19B in upper and lower ends of filling plates are arranged so that one type of passages in the upper stage is positioned on the same type of passages of the lower stage.

The water bath 5 is divided into upper and lower baths 15A and 15B by a partition plate 17 which constitutes a bottom plate of the upper tank 15A. In the partition plate 17, uniformly distributed holes are formed for hot water to flow into the lower bath 15B. Spray nozzles 16A are mounted at the bottom of the partition plate 17 for spraying hot water in the water bath 15A to the switchable passages 19A. The lower bath 15B is formed excluding areas where the upper spray nozzles 16A are located. Mounted at the bottom plate of the lower tank 15B are spray nozzles 16B which are for spraying hot water into wet passages 19B.

Supply tubes 20A and 20B for supplying hot water to the divided water baths 15A and 15B are provided respectively, and valves 21A and 21B are furnished on both supply tubes 20A and 20B respectively.

Furthermore, in between the upper and lower stages of the filling plates 19 and 19, a first midway bath 24A and a second midway bathes 24B are provided to receive hot water flowing down respective passages 19A and 19B of the upper filling plates 19. The first midway bath 24A receives hot water flowing down from the switchable passages 19A of the upper filling plates 19, and directs hot water to flow into the switchable passages 19A of the lower filling plates 19. The second midway bath 24B receives hot water flowing down wet passages 19B of the upper filling plates and directs the hot water to flow into the wet passages 19B of the lower filling plates 19. The first midway bath 24A is provided at a higher position than that of the second midway bath 24B, such that hot water received by the second midway bath 24B does not flow into the first midway bath 24A, and prevents flow into the switchable passages 19A of the lower filling plates 19. At the bottom of the first midway bath 24A, midway spray nozzles 25A are provided for spraying hot water to the switchable passages 19A of the lower filling plates 19, and midway spray nozzles 25B are also provided for spraying hot water into the wet passages 19B of the lower filling plates 19.

The operation of this cooling tower is explained below.

When the temperature of the open air is high such that generation of the white vapor is not anticipated, hot water is supplied to the upper tank 15A. The hot water sprayed by the first spray nozzles 16A mounted below the partition plate 17 is directed into the switchable passages 19A. At the same time, a portion of the hot water flowing into the lower bath 15B through holes 18 of the partition plate 17 is sprayed into the wet passages 19B by the second spray nozzles 16B. Accordingly, hot water is sprayed into both switchable and wet passages of the filling plates 19; thus, cooling of hot water is performed in all passages of the filling unit, and efficient cooling results by direct contact of the water with the open air in the whole heat dissipation unit.

On the other hand, when the temperature of the open air is low and generation of white vapor is anticipated, hot water is only supplied into the lower tank 15B. The delivery of hot water to the switchable passages is then suspended, and the hot water is supplied by spraying only into the wet passages 19B. The cooling is performed in the wet passages 19B by direct contact of hot water with the open air, and at the same time, the open air is dry-heated during passing through the switchable passages, and the wet air generated in the wet passages 19B is mixed and exhausted with the dry air produced by the dry-heating in the switchable passages 19A; thus, generation of white vapor is prevented.

As shown above, the switchable passages 19A are utilized for dry-heating when the white vapor is anticipated, which allows elimination of the air-heater installed for an exclusive use. Therefore, the height and the size of the cooling tower can be reduced and also the construction cost can be reduced by rendering the cooling tower structure comparatively simple.

The new structure of the present invention facilitates switching of the cooling tower from the wet operating mode to the half-dry and half-wet operating mode. That is, water bath 15 was partitioned by a partition plate 17 into the upper bath 15A and the lower bath 15B. Uniformly distributed holes are formed in the partition plate, and in the bottom plates of both upper and lower baths 15A and 15B, spray nozzles 16A and 16B are provided to direct sprayed water into the wet passages and switchable passages exclusively. Therefore, when hot water is supplied to the upper bath 15A, water flows into the lower bath as well, and water is sprayed into both the wet and switchable passages 19A and 19B, and when hot water is supplied only into the lower bath 15B, then hot water is supplied only into the wet passages 19B, and heat dissipation is performed in the wet passages 19B and the switchable passages 19A are used for producing dry-air.

Accordingly, the changeover operation from the wet operating mode to the half-wet and half-dry mode can be easily performed by merely changing the water supply lines from the supply line 20A to the supply line 20B by closing the valve 21A and opening the valve 21B. In addition, performances in two different operating modes is maintained by providing the midway baths 24A and 24B, because hot water flowing down in wet passages is prevented from flowing into the switchable passages.

Manual valves 21A and 21B may be used to change-over the hot water supply lines, as shown in FIG. 3 (a), but automatic transfer valves 31A and 31B can be equipped as shown in FIG. 3 (b) for automatic change-over of the operating mode.

The feature of present invention is, as shown above, to separate the passages defined by the filling plates into two passages, that is, the wet passages and the switchable passages. When the temperature of the open air is low and danger of the white vapor is anticipated, a part of the passages, the switchable passages, are used for heating air to produce dry air. As a result, the exclusive air-heater does not need to be installed in the present cooling tower. Thus, the size of the present cooling tower can be reduced, and because of the simple structure, the construction cost can be reduced.

The other feature of the present invention is that changeover from wet operating mode to half-dry and half-wet operating mode can be carried out by merely changing from the water supply into the upper bath to the water supply into the lower bath. The change of the water supply can be conducted by closing one valve and opening the other valve manually or automatically.

In addition, the other feature of the present invention is that by providing a midway bath in between the upper and the lower filling pates, water flowing down the wet passages and switchable passages can be separated, and the performances under the wet operating mode and the wet-and-dry operating mode can be clearly maintained.

What is claimed is:

1. A cross flow type cooling tower comprising:

a water bath disposed on a casing covering heat dissipation units for storing hot-water to be cooled, said water bath being divided into an upper bath and a lower bath by a partition plate, said partition plate having a plurality of uniformly distributed holes;

water supply tubes for exclusively supplying hot water to said upper bath and said lower bath respectively, each of said supply tubes being equipped with respective transfer valves;

multiple stacked heat dissipation units, each of which consists of a plurality of filling plates arranged vertically and parallel with each other so as to define passages therebetween, said passages being separated into wet passages and switchable passages;

water spray means for spraying water stored in said water bath into wet passages and switchable passages;

wherein operation of said cooling tower is changed from a wet operating mode to a wet-and dry operating mode by switching said water supply from the upper bath to the lower bath, respectively.

2. A cooling tower as claimed in claim 1, wherein said wet operating mode is a operating mode in which water is sprayed into each passage defined by the filling plates for flowing down for cooling by direct contact with open air, and said wet-and-dry operating mode is the operating mode in which water is sprayed only into said wet passages and said switchable passages are used to produce dry-air for mixing with moist air produced in said wet passages, wherein said wet operating mode is selected when the temperature of ambient air is high, whereas the wet-and-dry operating mode is selected when the temperature of ambient air is low so that generation of white vapor is anticipated.

3. A cooling tower as claimed in claim 1, wherein said spray means are spray nozzles disposed at the bottom of the upper and lower baths of said water bath, said spray nozzles at the bottom of the upper bath being disposed for spraying water exclusively into said switchable passages, and said spray nozzles at the bottom of the lower bath being disposed for spraying water into wet passages.

4. A cooling tower as claimed in claim 1, wherein said lower bath of said water bath is formed excluding the area where the spray nozzles for said switchable passages are disposed, wherein said lower bath of the water bath has spray nozzles for spraying water exclusively into said wet passages, and when the water is supplied into the upper bath, said spray nozzles of the upper bath spray water into said switchable passages, and at the same time, the spray nozzles spray water flowing from the upper bath into the lower bath into said wet passages.

5. A cooling tower as claimed in claim 1, wherein said change-over operation of the water supply from the upper bath to the lower bath is performed by closing said valve of the water supply line to the lower bath and by opening said valve of the water supply line to the upper bath.

6. A cooling tower as claimed in claim 1, wherein said valves equipped on the water supply pipes for supplying water into the upper and the lower bathes are automatic transfer valves, and said changeover operation of the water supply is performed by automatic switching said automatic transfer valves.

7. A cross flow type cooling tower as claimed in claim 1, wherein a first midway bath and a second midway bath for receiving hot water flowing from the wet passages and the switchable passages are disposed respectively in between the upper heat dissipation unit and the lower heat dissipation unit in order to prevent hot water flowing down in the wet passages from flowing into the switchable passages.

8. A cooling tower as claimed in claim 6, wherein said midway bath for receiving water flowing down in the switchable passages is disposed at higher position than the midway bath for receiving water flowing down in the wet passages.

* * * * *